United States Patent
Ye et al.

(10) Patent No.: US 12,556,147 B2
(45) Date of Patent: Feb. 17, 2026

(54) SINGLE POWER AMPLIFIER-DRIVEN SIGNAL CONTROL SYSTEM AND METHOD

(71) Applicant: AAC Technologies (Nanjing) Co., Ltd., Nanjing (CN)

(72) Inventors: Lijian Ye, Nanjing (CN); Yuheng Jiang, Nanjing (CN)

(73) Assignee: AAC Technologies (Nanjing) Co., Ltd., Nanjing (CN)

( * ) Notice: Subject to any disclaimer, the term of this patent is extended or adjusted under 35 U.S.C. 154(b) by 247 days.

(21) Appl. No.: 18/330,325

(22) Filed: Jun. 6, 2023

(65) Prior Publication Data

US 2024/0333237 A1  Oct. 3, 2024

Related U.S. Application Data

(63) Continuation of application No. PCT/CN2023/093640, filed on May 11, 2023.

(30) Foreign Application Priority Data

Mar. 31, 2023  (CN) .......................... 202310340932.X

(51) Int. Cl.
  *H03F 3/24* (2006.01)
  *H02N 2/00* (2006.01)
  *H04R 3/04* (2006.01)

(52) U.S. Cl.
  CPC ............. *H03F 3/245* (2013.01); *H02N 2/001* (2013.01); *H04R 3/04* (2013.01)

(58) Field of Classification Search
  CPC .. H04R 3/04; H04R 2430/01; H04R 2499/11; G08B 6/00; G08B 3/10; H03F 3/245; H02N 2/001

USPC ................ 381/162, 163, 164, 120, 121, 123
  See application file for complete search history.

(56) References Cited

U.S. PATENT DOCUMENTS

| | | | | |
|---|---|---|---|---|
| 6,809,635 B1 * | 10/2004 | Kaaresoja | ........... | H04M 1/6016 340/407.1 |
| 8,189,809 B2 * | 5/2012 | Aarts | .................. | H04M 1/6016 381/103 |
| 9,594,428 B2 * | 3/2017 | Tao | .......................... | G06F 3/016 |
| 11,848,972 B2 * | 12/2023 | Adams | .................. | H04B 1/385 |

(Continued)

FOREIGN PATENT DOCUMENTS

CN    105609123 A  *  5/2016  ............. G11B 31/00

*Primary Examiner* — Xu Mei
(74) *Attorney, Agent, or Firm* — Wiersch Law Group

(57) ABSTRACT

A single power amplifier-driven signal control system for driving a two-in-one device integrating a first component capable of generating sound and a second component capable of generating vibration, where the two-in-one device includes a first input end and a second input end for introducing a signal respectively to the first component and the second component. The signal control system includes a signal control module, configured to determine an operating mode required for a current state based on an input signal, and generate an output signal for driving the two-in-one device based on the input signal and operating mode; a power amplifier, configured to amplify the output signal to obtain an amplified drive signal; and a front-end circuit module, configured to load the amplified drive signal to the first input end and/or the second input end to drive the first component and/or the second component to operate.

8 Claims, 4 Drawing Sheets

(56) References Cited

U.S. PATENT DOCUMENTS

| | | | |
|---|---|---|---|
| 2009/0156266 A1* | 6/2009 | Linjama | H04M 19/04 455/567 |
| 2015/0163590 A1* | 6/2015 | Hsu | H04R 3/04 381/123 |
| 2024/0136986 A1* | 4/2024 | Linghu | H03F 3/187 |
| 2024/0334126 A1* | 10/2024 | Ye | G08B 6/00 |

* cited by examiner

SINGLE POWER AMPLIFIER-DRIVEN SIGNAL CONTROL SYSTEM AND METHOD

TECHNICAL FIELD

The present application relates to signal control modules, and more particularly to a single power amplifier-driven signal control system and method.

BACKGROUND

The existing mobile devices need to be multi-functional, and thus more or more components are integrated therein. In the case of the limited overall space, how to reduce the size of components and improve the space utilization has been a problem urgently to be solved for the manufacturers.

The prior art discloses a two-in-one device integrating a speaker and a motor, where the speaker and motor can be connected separately to the power amplifier in a conventional way. This two-in-one device is beneficial to the size reduction of the terminal equipment.

However, although different components are integrated in the existing two-in-one devices, there is no distinguishment between connection manners of individual components, such that the control system in the terminal device is not simplified, and the overall control method still remains to be optimized.

Therefore, it is urgently needed to design and develop a novel signal control module to solve the above problems.

SUMMARY

The technical problem to be solved by the present application is to provide a system and method for independent signal control of a two-in-one device.

Technical solutions of this application will be specifically described below.

In a first aspect, this application provides a single power amplifier-driven signal control system, wherein the signal control system is configured to drive a two-in-one device integrating a first component capable of generating sound and a second component capable of generating vibration; the two-in-one device includes a first input end for introducing a first signal to the first component and a second input end for introducing a second signal to the second component; and the signal control system includes:
- a signal control module;
- a power amplifier; and
- a front-end circuit module;
- wherein the signal control module is configured to receive an input signal, determine an operating mode required for a current state based on the input signal, and generate an output signal for driving the two-in-one device based on the input signal and the operating mode; wherein the input signal includes a vibration signal, an audio signal or a combination thereof; and the operating mode includes single operation of the first component, single operation of the second component, and simultaneous operation of the first component and the second component;
- the power amplifier is configured to amplify the output signal to obtain an amplified drive signal; and the number of the power amplifier is one; and
- the front-end circuit module is configured to load the amplified drive signal to the first input end and/or the second input end to drive the first component and/or the second component to operate.

In some embodiments, the signal control module includes a function determination sub-module and a signal generation sub-module; wherein the function determination sub-module is configured to determine the operating mode required for the current state according to the input signal, and generate a synergetic operation determination result of the two-in-one device based on the input signal and the operating mode; and the signal generation sub-module is configured to generate the output signal according to the input signal and the synergetic operation determination result.

In some embodiments, the signal control module further includes a post-processing sub-module, wherein the post-processing sub-module is configured to optimize the output signal according to a preset post-processing method and output an optimized output signal when the output signal is an audio signal.

In some embodiments, the signal control module further includes a protection sub-module, wherein the protection sub-module is configured for real-time power control and output of the output signal according to a parameter model of the two-in-one device, so as to prevent a power of the output signal from exceeding a maximum operating power of the two-in-one device.

In some embodiments, the signal control module further includes a nonlinear compensation sub-module, wherein the nonlinear compensation sub-module is configured for nonlinear harmonic compensation and output of the output signal according to a parameter model of the two-in-one device.

In some embodiments, the front-end circuit module includes a high-pass filtering unit and a low-pass filtering unit; the high-pass filtering unit is configured to perform high-pass filtering on the amplified drive signal to obtain a high-frequency signal and load the high-frequency signal to the first component; and the low-pass filtering unit is configured to perform low-pass filtering on the amplified drive signal to obtain a low-frequency signal and load the low-frequency signal to the second component.

In some embodiments, the first component is a speaker, and the second component is a vibration motor.

In some embodiments, the front-end circuit module includes a signal source for receiving the amplified drive signal and a capacitor; a positive end of the signal source is connected to a first end of the capacitor; a negative end of the signal source is connected to a second end of the capacitor and ground; the first component is connected in series between the second end of the capacitor and the negative end of the signal source, such that the capacitor is configured as a high-pass filtering unit and to load a high-frequency signal passing through the capacitor to the first component; the capacitor is connected in parallel with the second component, such that the capacitor is configured as a low-pass filtering unit and to load a low-frequency signal blocked by the capacitor to the second component.

In a second aspect, this application provides a signal control method for a single power amplifier-driven two-in-one device, wherein the two-in-one device includes a speaker having a first input end and a vibration motor having a second input end; and the signal control method includes:
- receiving an audio signal and/or a vibration signal, and generating an output signal for driving the two-in-one device;
- amplifying the output signal to obtain an amplified drive signal; and
- loading the amplified drive signal to the speaker and/or the vibration motor through an analog circuit to drive the two-in-one device;

wherein the signal control method is implemented through the above single power amplifier-driven signal control system.

In some embodiments, the step of "loading the amplified drive signal to the speaker and/or the vibration motor through an analog circuit" is performed through steps of:

filtering the amplified drive signal, and loading a high-frequency part in the amplified drive signal to the speaker, wherein the high-frequency part has a frequency above a preset cut-off frequency; and/or loading a low-frequency part in the amplified drive signal to the vibration motor, wherein the low-frequency part has a frequency below the preset cut-off frequency.

Compared to the prior art, this application has the following beneficial effects.

In the single power amplifier-driven signal control system provided herein, for a two-in-one device integrating functionally-different components, the audio signal and/or vibration signal is received through the signal control module, and an output signal for driving the two-in-one device is generated; the output signal is amplified through the signal amplification module to obtain an amplified drive signal; and finally, the front-end circuit module is connected to the first input end and second input end of the two-in-one device, and the amplified drive signal is loaded to individual components in the two-in-one device through the front-end circuit module. The signal amplification module is a single power amplification unit. By means of the signal control method and circuit design provided herein, the components in the two-in-one device can be separately driven according to the input signal to enable the independent control and use of the two components, thereby simplifying the drive circuit, reducing the manufacture cost of the terminal equipment, and improving the space utilization within the terminal equipment.

BRIEF DESCRIPTION OF THE DRAWINGS

In order to illustrate the technical solutions in the embodiments of the present application more clearly, the drawings needed in the description of the embodiments of the present application will be briefly described below. Obviously, presented in the drawings are merely some embodiments of this application, which are not intended to limit this application. For those skilled in the art, other drawings can be obtained based on the drawings provided herein without making creative effort.

DETAILED DESCRIPTION OF THE EMBODIMENTS

The technical solutions of the present application will be described clearly and completely below with reference to the accompanying drawings and embodiments. Obviously, described below are merely some embodiments of the present application, which are not intended to limit the present application. It should be understood that other embodiments obtained by those skilled in the art based on the content disclosed herein without making creative effort should fall within the scope of the present application.

Figure 1:
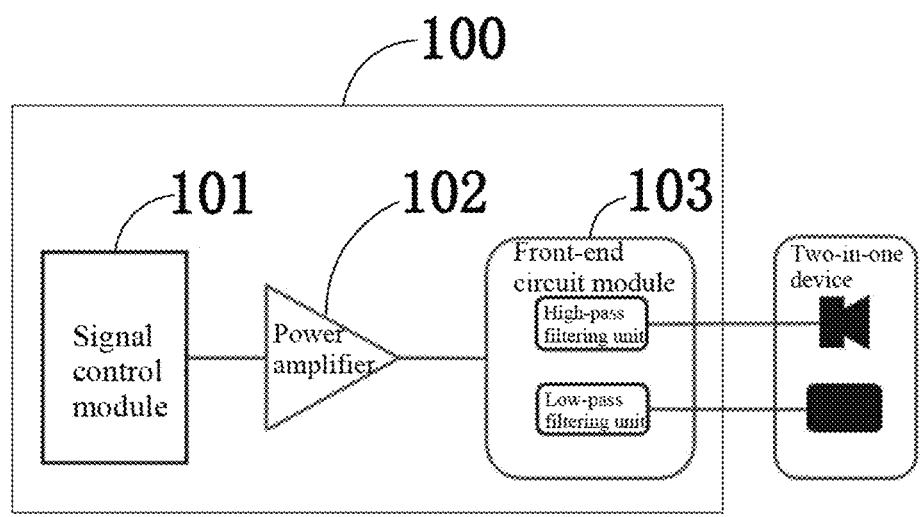
FIG. 1 structurally illustrates a single power amplifier-driven signal control system according to an embodiment of the present application.

An embodiment of this application provides a single power amplifier-driven signal control system, which is structurally shown in FIG. 1. The signal control system 100 is configured to drive a two-in-one device integrating a first component capable of producing sound and a second component capable of producing vibration. The two-in-one device includes a first input end for introducing a first signal to the first component and a second input end for introducing a second signal to the second component. The signal control system 100 includes:

a signal control module 101;
a power amplifier 102; and
a front-end circuit module 103;
where the signal control module 101 is configured to receive an input signal, determine an operating mode required for a current state based on the input signal, and generate an output signal for driving the two-in-one device based on the input signal and the operating mode; where the input signal includes a vibration signal, an audio signal or a combination thereof; and the operating mode includes single operation of the first component, single operation of the second component, and simultaneous operation of the first component and the second component;
the power amplifier 102 is configured to amplify the output signal to obtain an amplified drive signal; and the number of the power amplifier 102 is one; and
the front-end circuit module 103 is configured to load the amplified drive signal to the first input end and/or the second input end to drive the first component and/or the second component to operate.

Figure 2:
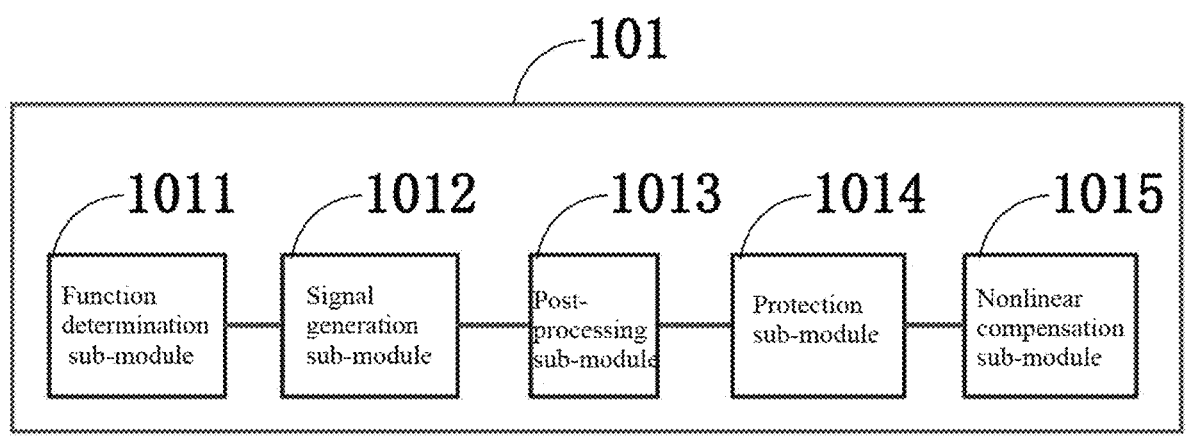
FIG. 2 structurally shows a signal control module in the signal control system according to an embodiment of this application.

In an embodiment, the signal control module 101 is composed of hardware capable of generating the output signal of the two-in-one device and an algorithmic software for controlling the output signal. Referring to an embodiment shown in FIG. 2, the signal control module 101 in the signal control system 100 includes:

a function determination sub-module 1011, configured to determine the operating mode required for the current state according to the input signal, and generate a synergetic operation determination result of the two-in-one device based on the input signal and the operating mode; and
a signal generation sub-module 1012, configured to generate the output signal according to the input signal and the synergetic operation determination result.

In an exemplary implementation, a carrier of the signal control module 101 may be a central processing unit (CPU) or a digital signal processing (DSP) unit of the terminal equipment, or a hardware device that can run algorithms (e.g., peripheral Codec and DSP on an amplifier chip). In the implementation based on CPU, individual modules can be formed based on the existing software algorithms. For the process of determining the operation mode required for the current state by the function determination sub-module 1011, when the input signal contains a first signal for controlling the first component and a second signal for controlling the second component, the first signal is different from the second signal in the presentation form. In some embodiments, the function determination sub-module 1011 can determine the operation mode according to the signal presentation or the source of the input signal.

In an embodiment, the signal control module 101 further includes a post-processing sub-module 1013 configured to optimize the output signal according to a preset post-processing method and output an optimized output signal when the output signal is an audio signal.

In an embodiment, the signal control module 101 further includes a protection sub-module 1014 configured for real-time power control and output of the output signal according to a parameter model of the two-in-one device, so as to prevent a power of the output signal from exceeding a maximum operating power of the two-in-one device.

In an embodiment, the signal control module 101 further includes a nonlinear compensation sub-module 1015 configured for nonlinear harmonic compensation and output of the output signal according to a parameter model of the two-in-one device.

Regarding the protection sub-module 1014 and the nonlinear compensation sub-module 1015, the parameter model of the two-in-one device may be a pre-constructed parameter set of the two-in-one device. By means of a specific signal processing algorithm, the frequency control and non-linear harmonic compensation of the output signal can be performed in the sub-modules, thereby protecting the two-in-one device from being damaged by the high-frequency signal, reducing the signal distortion and improving acoustic or vibration effects.

In an embodiment, the power amplifier 102 can be implemented on the basis of a special-purpose chip for signal amplification, and its function may be ordinary linear power amplification or intelligent power amplification involving voltage and current feedback signals. In the implementation, the parameters of individual sub-modules in the signal control module 101 need to be adjusted according to the chip used in the power amplifier 102. It should also be noted that the connection order of various sub-modules in the embodiment of the present application is not limited to the order illustrated in FIG. 2. In the actual implementation process, the sub-modules can be connected according to the signal characteristics and the output acoustic and vibration effects in accordance with the processing of the output signal.

In an embodiment, the front-end circuit module 103 includes a high-pass filtering unit and a low-pass filtering unit, where the high-pass filtering unit is configured to perform high-pass filtering on the amplified drive signal to obtain a high-frequency signal and load the high-frequency signal to the first component; and the low-pass filtering unit is configured to perform low-pass filtering on the amplified drive signal to obtain a low-frequency signal and load the low-frequency signal to the second component.

In an embodiment, the first component is a speaker, and the second component is a vibration motor.

In an embodiment, the front-end circuit module 103 includes a signal source for receiving the amplified drive signal and a capacitor; a positive end of the signal source is connected to a first end of the capacitor; a negative end of the signal source is connected to a second end of the capacitor and ground; the first component is connected in series between the second end of the capacitor and the negative end of the signal source, such that the capacitor is configured as a high-pass filtering unit and to load a high-frequency signal passing through the capacitor to the first component; the capacitor is connected in parallel with the second component, such that the capacitor is configured as a low-pass filtering unit and to load a low-frequency signal blocked by the capacitor to the second component.

Figure 3:
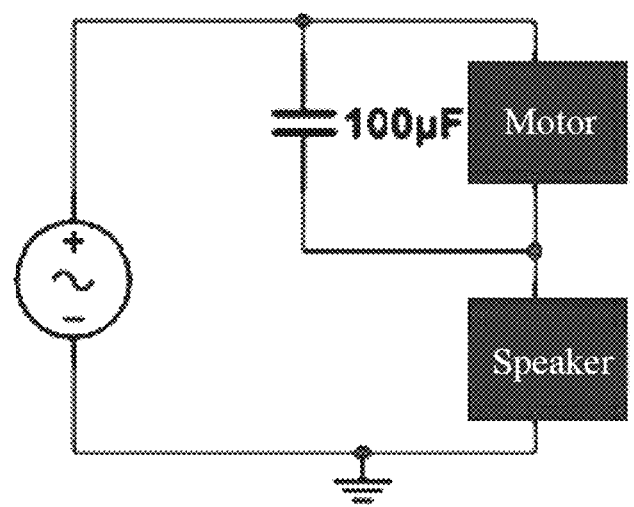
FIG. 3 is a schematic diagram of a front-end circuit module in signal control system according to an embodiment of this application.

FIG. 3 exemplarily shows a schematic diagram of the front-end circuit module 103 provided by an embodiment of the present application. In the case where the speaker is a speaker and the vibration motor is a motor, since an operating frequency band the motor is generally below 200 Hz and an operating frequency band of the speaker is generally above 200 Hz, the cut-off frequency is preset to 200 Hz for the front-end circuit shown in FIG. 3, such that after passing through the front-end circuit, the high-frequency part (above 200 Hz) in the amplified drive signal is loaded to two ends of the speaker, and the low-frequency part (below 200 Hz) is loaded to two ends of the motor, ensuring that the two components can work alone or simultaneously.

It should be noted that FIG. 3 merely illustrates a preferred connection and effect of the front-end circuit module 103. For the two-in-one device formed by a motor and a speaker, the specific connection may be the series connection in FIG. 3, or parallel connection in the presence of other components. Different connection methods correspond to different power amplifiers and front-end circuits, and the specific connection can be adjusted according to the actual need. Moreover, regarding the single power amplifier-driven signal control system provided herein, the function of the front-end circuit is limited in the design of the front-end circuit module 103, such that the signal control module 101 of the present application is not limited to be used for two-in-one devices, for example, the technical effect described above can also be achieved by connecting a motor and a speaker independent of each other to the front-end circuit module 103.

In the single power amplifier-driven signal control system provided herein, for a two-in-one device integrating functionally-different components, the audio signal and/or vibration signal is received through the signal control module, and an output signal for driving the two-in-one device is generated; the output signal is amplified through the signal amplification module to obtain an amplified drive signal; and finally, the front-end circuit module is connected to the first input end and second input end of the two-in-one device, and the amplified drive signal is loaded to individual components in the two-in-one device through the front-end circuit module. The signal amplification module is a single power amplification unit. By means of the signal control method and circuit design provided herein, the components in the two-in-one device can be separately driven according to the input signal to enable the independent control and use of the two components, thereby simplifying the drive circuit, reducing the manufacture cost of the terminal equipment, and improving the space utilization within the terminal equipment.

Figure 4:
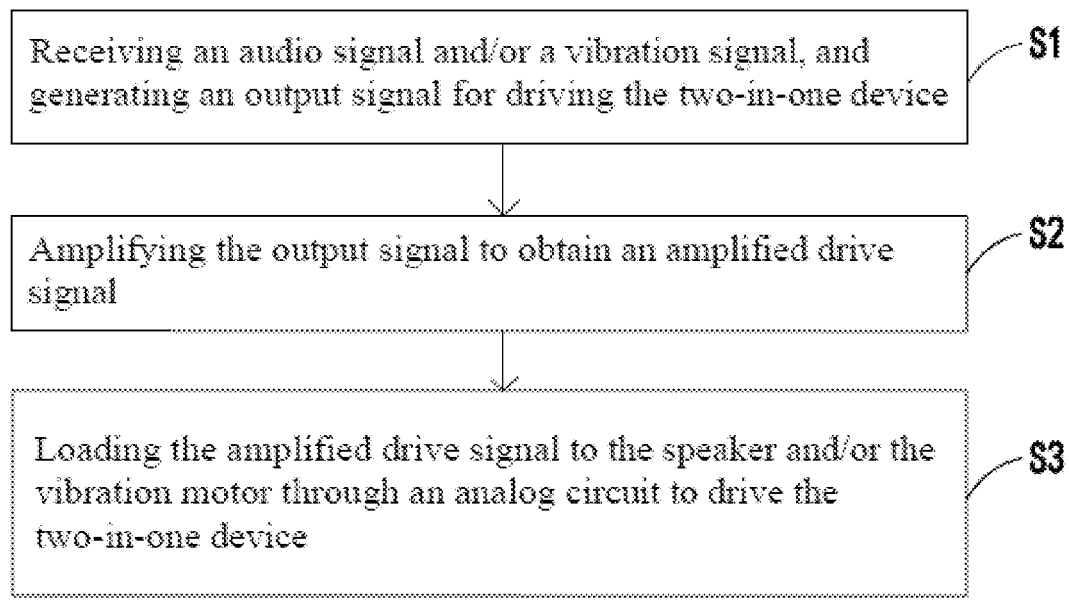
FIG. 4 is a flow chart of a single power amplifier-driven signal control method for a two-in-one device according to an embodiment of this application.

An embodiment of the present application also provides a signal control method for a single power amplifier-driven two-in-one device, whose flow chart is displayed in FIG. 4. The two-in-one device includes a speaker having a first input end and a vibration motor having a second input end. The signal control method includes the following steps.

(S1) An audio signal and/or a vibration signal and/is received, and an output signal for driving the two-in-one device is generated.

(S2) The output signal is amplified to obtain an amplified drive signal.

(S3) The amplified drive signal is loaded to the speaker and/or the vibration motor through an analog circuit to drive the two-in-one device.

The signal control method is implemented based on the above single power amplifier-driven signal control system.

In some embodiments, the step (S3) is performed through steps of:

filtering the amplified drive signal, and loading a high-frequency part in the amplified drive signal to the speaker, where the high-frequency part has a frequency above a preset cut-off frequency; and/or loading a low-frequency part in the amplified drive signal to the vibration motor, where the low-frequency part has a frequency below the preset cut-off frequency.

The described signal control method, when implemented, can arrive at the same technical effect as the signal control system described above, and thus the technical effect of the signal control method will not be described herein.

Described above are merely preferred embodiments of the present application, which are not intended to limit the present application. It should be understood that any variations, replacements and modifications made by those of ordinary skill in the art without departing from the spirit and scope of the present application shall fall within the scope of the present application defined by the appended claims.

What is claimed is:

1. A single power amplifier-driven signal control system, the signal control system being configured to drive a two-in-one device integrating a first component capable of generating sound and a second component capable of generating vibration; the two-in-one device comprising a first input end for introducing a first signal to the first component and a second input end for introducing a second signal to the second component; and the signal control system comprising:
    a signal control module;
    a power amplifier; and
    a front-end circuit module;
    wherein the signal control module is configured to receive an input signal, determine an operating mode required for a current state based on the input signal, and generate an output signal for driving the two-in-one device based on the input signal and the operating mode; wherein the input signal comprises a vibration signal, an audio signal or a combination thereof; and the operating mode comprises single operation of the first component, single operation of the second component, and simultaneous operation of the first component and the second component;
    the power amplifier is configured to amplify the output signal to obtain an amplified drive signal; and the number of the power amplifier is one; and
    the front-end circuit module is configured to load the amplified drive signal to the first input end and/or the second input end to drive the first component and/or the second component to operate;
    wherein the signal control module comprises:
    a function determination sub-module;
    a signal generation sub-module; and
    a protection sub-module;
    wherein the function determination sub-module is configured to determine the operating mode required for the current state according to the input signal, and generate a synergetic operation determination result of the two-in-one device based on the input signal and the operating mode; and the signal generation sub-module is configured to generate the output signal according to the input signal and the synergetic operation determination result; and the protection sub-module is configured for real-time power control and output of the output signal according to a parameter model of the two-in-one device, so as to prevent a power of the output signal from exceeding a maximum operating power of the two-in-one device.

2. The signal control system of claim 1, wherein the signal control module further comprises a post-processing sub-module; and the post-processing sub-module is configured to optimize the output signal according to a preset post-processing method and output an optimized output signal when the output signal is an audio signal.

3. The signal control system of claim 1, wherein the signal control module further comprises a nonlinear compensation sub-module; and the nonlinear compensation sub-module is configured for nonlinear harmonic compensation and output of the output signal according to a parameter model of the two-in-one device.

4. The signal control system of claim 1, wherein the front-end circuit module comprises a high-pass filtering unit and a low-pass filtering unit; the high-pass filtering unit is configured to perform high-pass filtering on the amplified drive signal to obtain a high-frequency signal and load the high-frequency signal to the first component; and the low-pass filtering unit is configured to perform low-pass filtering on the amplified drive signal to obtain a low-frequency signal and load the low-frequency signal to the second component.

5. The signal control system of claim 4, wherein the first component is a speaker, and the second component is a vibration motor.

6. The signal control system of claim 4, wherein the front-end circuit module comprises a signal source for receiving the amplified drive signal and a capacitor; a positive end of the signal source is connected to a first end of the capacitor; a negative end of the signal source is connected to a second end of the capacitor and ground; the first component is connected in series between the second end of the capacitor and the negative end of the signal source, such that the capacitor is configured as the high-pass filtering unit and to load a high-frequency signal passing through the capacitor to the first component; the capacitor is connected in parallel with the second component, such that the capacitor is configured as the low-pass filtering unit and to load a low-frequency signal blocked by the capacitor to the second component.

7. A single power signal control method for a single power amplifier-driven two-in-one device, the signal control method being implemented based on the signal control system of claim 1; the two-in-one device comprising a speaker having a first input end and a vibration motor having a second input end; and the signal control method comprising:
    receiving an audio signal and/or a vibration signal, and generating an output signal for driving the two-in-one device;
    amplifying the output signal to obtain an amplified drive signal; and
    loading the amplified drive signal to the speaker and/or the vibration motor through an analog circuit to drive the two-in-one device.

8. The signal control method of claim 7, wherein the step of "loading the amplified drive signal to the speaker and/or the vibration motor through an analog circuit" is performed through steps of:
    filtering the amplified drive signal, and loading a high-frequency part in the amplified drive signal to the speaker, wherein the high-frequency part has a frequency above a preset cut-off frequency; and/or
    loading a low-frequency part in the amplified drive signal to the vibration motor, wherein the low-frequency part has a frequency below the preset cut-off frequency.

* * * * *